United States Patent [19]

Wittington

[11] Patent Number: 4,930,728
[45] Date of Patent: Jun. 5, 1990

[54] RAM AIR AERIAL DEVICE WITH LOWER SKIN PRESSURE REGULATOR

[76] Inventor: George R. Wittington, 206 W. York St., Dillsburg, Pa. 17019

[21] Appl. No.: 341,211

[22] Filed: Apr. 21, 1989

[51] Int. Cl.$^5$ .............................................. B64D 17/02
[52] U.S. Cl. .................................................. 244/145
[58] Field of Search ................ 244/142, 145, 146, 152

[56] References Cited

U.S. PATENT DOCUMENTS

| | | |
|---|---|---|
| Re. 26,427 | 7/1968 | Jalbert . |
| 3,285,546 | 11/1966 | Jalbert . |
| 3,524,613 | 8/1970 | Reuter et al. . |
| 3,724,789 | 4/1973 | Snyder . |
| 3,749,337 | 7/1973 | Jalbert . |
| 3,822,844 | 7/1974 | Sutton . |
| 3,972,495 | 8/1976 | Jalbert . |
| 4,191,349 | 3/1980 | Pravaz . |
| 4,705,238 | 11/1987 | Gargano . |
| 4,729,530 | 3/1988 | Jalbert . |
| 4,771,970 | 9/1988 | Sutton . |

*Primary Examiner*—Galen Barefoot
*Attorney, Agent, or Firm*—Sixbey, Friedman, Leedom & Ferguson

[57] ABSTRACT

A ram air type parachute cell has a leading edge, a trailing edge, two side ribs, a flexible upper skin, and a flexible lower skin. A central rib is disposed substantially centrally between the first and second ribs to divide the cell into a plurality of compartments. The lower sheet includes a first forward skin and a second rearward skin. The rear portion of the first forward skin and the front portion of the second rearward skin form a closable air inlet vent opening into the cell. Each side of the rear portion of the first forward skin is connected at a connection point to the respective rib at a point spaced above the junction of the second rearward skin and the rib. When air pressure inside the cell exceeds the air pressure outside the cell, the rear portion of the first forward skin is forced onto the front portion of the second rearward skin to close the air inlet vent by lying substantially flat on the front portion of the second rearward skin without billowing out of the cell to maintain air pressure inside said cell. When the air pressure outside the cell exceeds the air pressure inside the cell, the rear portion of the first forward skin is forced upwardly away from the front portion of the second rearward skin to open the air inlet vent.

27 Claims, 4 Drawing Sheets

RAM AIR AERIAL DEVICE WITH LOWER SKIN PRESSURE REGULATOR

TECHNICAL FIELD

The present invention relates to flow form devices used to maintain both vertical and horizontal stability and maneuverability in a predetermined environment, such as a parachute in air. More particularly, the present invention relates to ram air type parachutes having a lower skin one way vent which acts as a pressure regulator to improve control of the parachute.

BACKGROUND OF THE INVENTION

Numerous devices are known in the prior art for controlling the vertical and horizontal passage of an article through a predetermined fluid environment. Such devices can generally be classified within one of two broad classifications; submarine and diving wing constructions for use in liquid environments; and flexible parachute constructions and rigid airfoil constructions used in gaseous environments. The present invention, while usable in devices in both classifications, is intended for use primarily in the latter classification and particularly with inflatable glide parachute configurations using cellular construction and ram air principles.

Since prior to the advent of gliding parachutes, for many years, parachutes were constructed by sewing a plurality of panels together to define a hemispherical structure when inflated. Some of these domelike parachutes have incorporated slits, vents, or baffles for controlling the flow of air therethrough, both to facilitate deployment and to provide maneuverability. However, these parachutes are adapted primarily for nearly vertical descent, and generally do not permit a load to be guided over substantial horizontal distances to a target landing area.

Recently, gliding parachutes have been developed for sport jumping, fire fighting, and military applications which can be readily manipulated to carry a load over a substantial horizontal distance. A typical gliding parachute is preformed and constructed in such a manner that when inflated it will define an airfoil in cross section. When a load is suspended from this type of inflated parachute, the parachute will glide forwardly and its airfoil shape will provide the necessary lift. By controlling the peripheral edges of the gliding parachute, the parachute and the load can be guided in their path of descent to a distant target. Numerous patents have been issued for ram air type gliding parachutes. U.S. Pat. No. 4,771,970 to Sutton, U.S. Pat. No. 4,729,530 to Jalbert, and U.S. Pat. No. 4,705,238 to Gargano disclose recent examples of such ram air type parachutes.

Much emphasis has been placed on the fabric and rigging configurations of previous gliding parachutes in an effort to approximate, as close as possible, a conventional airfoil shape. This results in maximum lift for a given parachute area which in turn provides maximum glide.

In a multi-cell gliding parachute, upper and lower fabric canopies are connected by laterally spaced fabric ribs. Suspension or support lines are connected at their upper ends to the parachute either directly or through flairs and coverage downwardly to a harness or other load supporting structure. A plurality of control lines are connected at or near the trailing end of the parachute toward each side to permit control of steering and braking. The fabric sections of the parachute are normally made of a high strength, lightweight fabric of suitable porosity.

One of the primary goals of inflatable multicell gliding parachutes using ram air type operation is to provide stability and maneuverability which are controllable both vertically and horizontally as the parachute travels through the atmosphere. It is desired to create a parachute which simultaneously minimizes bulk and weight and which is controllable through the vast array of maneuvers. However, while substantial steps have been taken toward this end in recent years, further improvement is necessary and desired.

A number of patents disclose various attempts to improve the stability, maneuverability, and control of ram air type parachutes. Pravaz, U.S. Pat. No. 4,191,349 discloses an airfoil type parachute having an air outlet passage 10 formed on the upper wall to regulate air flow and prevent instability by enhancing laminar flow around the parachute. Additionally, this parachute is formed of two separate cells along the cord length (front to back), with an air inlet 20 opening into a passage disposed in front of the rear cell, and a passage 16 for air to exit from the passage. However, this second rear cell does not necessarily enhance performance of the parachute during vertical descent, stall recovery, or initial inflation of the parachute. Nor does the second cell and its air inlets and outlets enhance the operation of the first forward cell. Additionally, air inlet 20 is not closable.

U.S. Pat. Nos. 3,749,337 and 3,972,495 both to Jalbert are directed to airfoil type parachutes or airwings having a single cell along the cord length. These patents disclose, in FIG. 3 for example, forming in lower layer 16 an opening 26 covered by a grill 32. The opening is provided with a flutter valve in the form of a flexible layer of material 28. When the pressure under the lower layer 16 is greater than that inside the wing, the pressure moves the flutter valve away from opening 26 to fill the wing with air. The flutter valve closes opening 26 when the pressure inside is greater than the pressure outside. However, these patents teach that grill 32 such as a mesh is required to be placed over opening 26 to prevent the flutter valve from falling through the opening and impairing the aerodynamic performance of the airwing. Moreover, opening 26 on the bottom of the wing is used instead of a leading edge opening. Thus, rather than improving performance, as emphasized in FIG. 3 and explained in the text of the patent, this feature is required not to enhance wing operation but simply to permit it.

Sutton U.S. Pat. No. 3,822,844 discloses a ram air type parachute having an air outlets 24 formed on the top wall 18 of each cell. These air passageways are intended to maintain parachute buoyancy. However, air inlets 22 on bottom wall 20 are required, at least in part, to offset the loss of air through outlets 24. This is exacerbated by cross vent ports 25 which permit air to exit from one cell into another, and out of all of the cells through outlets 24, including the end cells, which can decrease performance of the parachute by reducing lift on the ends. Furthermore, air inlets 22 are not closable when the inside pressure is sufficient.

Thus, what is desired and not provided by any of the prior art patents, is a gliding ram air type parachute which has improved stall recovery, vertical descent, and initial inflation characteristics, all of which can be provided by a closable, pressure operated air vent opening formed on the lower skin of the parachute, and which supplements the leading edge air inlet. Toward these ends, an earlier embodiment of the present invention included a parachute formed of a plurality of parachute cells 10, as shown in FIG. 1, formed of an upper sheet 12, a lower sheet 14, and two side sheets or ribs 16. Each cell is divided into two compartments by a central sheet or rib 18. Lower sheet 14 is formed of a forward skin 20 and a rearward skin 22. Forward skin 20 forms the leading edge of lower sheet 14, rearward skin 22 forms the trailing edge, and forward skin 20 overlaps rearward skin 22. Forward skin 20 is attached at each end of its rear edge to a junction or hinge point of rearward skin 22 and a respective side rib 16. The central point of the rear edge of forward skin 20 is connected to the junction or hinge point of rearward skin 22 and central rib 18. A mesh panel 24 is formed across the air inlet 26 which is formable between the forward and rearward skins. During various maneuvers, when the air pressure outside cell 10 exceeds the air pressure inside, the rear portion or flap 28 of forward skin 20 billows upwardly to form an arc-shaped opening between respective side ribs 16 and central rib 18 to allow additional air to enter cell 10. When the air pressure inside cell 10 increases to exceed that outside, the interior air pressure forces flap 28 downwardly to close air inlet 26. However, because of the excess material on flap 28 required to form air inlet 26, flap 28 and the remainder of forward skin 20 does not lie flat when opening 26 is closed. Because this portion of lower sheet 14 is not smooth it creates drag. Additionally, mesh panel 24 is required to prevent flap 28 from billowing below and outside of cell 10 and creating drag. Mesh panel 24 adversely increases the weight and bulk of the parachute, thereby decreasing performance, and mesh panel 24 also increases the manufacturing requirements and costs by requiring additional material and sewing.

SUMMARY OF THE INVENTION

It is an object of the present invention to provide a cell of the type used primarily to maintain both vertical and horizontal stability and maneuverability in a predetermined fluid environment having improved stall recovery, vertical descent, and initial inflation characteristics.

It is another object of the present invention to provide a parachute cell for a ram air type parachute having improved stall recovery, vertical descent, initial inflation, and overall aerodynamic characteristics.

It is another object of the present invention to provide a parachute cell that accomplishes the above objects using a lower skin air inlet vent opening.

It is another object of the present invention to provide a parachute cell of a predetermined size having a reduced area leading edge air inlet without reducing performance.

It is another object of the present invention to provide a closable one way air inlet vent opening which is closable by a flap of material that lays relatively flat, does not bunch up, and does not billow out of the opening.

It is another object of the present invention to provide the air inlet vent opening of the above objects without using a mesh panel to restrict movement of the flap.

It is another object of the present invention to provide the cell of the above objects in which the flap is part of the front portion of the lower skin.

It is another object of the present invention to provide the cell of the above objects in which the rear end of the flap is connected to the side ribs of the cell above the junction of the side ribs and the rear portion of the lower skin.

It is another object of the present invention to provide a parachute cell having a plurality of air inlet vent openings.

It is another object of the present invention to provide a parachute cell having at least one central rib dividing the cell into a plurality of compartments, and in which each compartment has an air inlet vent opening.

It is another object of the present invention to provide a parachute cell according to the above objects having load supporting lines connectable to load supporting side ribs in which at least one of the load supporting lines is connectable to the respective load supporting side rib at a point above the junction of the side rib and the rear portion of the lower skin.

It is another object of the present invention to provide a parachute cell according to the above objects in which the side ribs are notched below the connection between the flap and the side ribs to conserve bulk and weight.

These and other objects are obtained by the parachute cell for a ram air type parachute according to the present invention. The parachute has a leading edge, a trailing edge, and two sides, and may be combined with other cells to form a ram air type parachute. The cell includes a flexible upper sheet or skin having a front edge, a rear edge, and first and second side edges. The front edge forms a portion of the leading edge of the cell and the rear edge forms a portion of the trailing edge of the cell. A flexible lower sheet or skin is spaced by way of ribs below the upper sheet and has a front edge, a rear edge, and first and second side edges. The front edge forms a portion of the leading edge of the cell and the rear edge forms a portion of the trailing edge of the cell. The rear edge of the lower sheet and the rear edge of the upper sheet are fastened together to form the trailing edge.

A pair of flexible side sheets or ribs connect the upper sheet to the lower sheet. A first rib is disposed between the first side edge of the upper sheet and the first side edge of the lower sheet along the entire length of the upper and lower sheets. A second rib is disposed between the second side edge of the upper sheet and the second side edge of the lower sheet along the entire length of the upper and lower sheets. At least one of these ribs may be load supporting. A central rib is disposed substantially centrally between the first and second ribs, and extends from the leading edge of the cell to the trailing edge of the cell. The central rib or ribs increase the rigidness and form of the cell. The central rib is connected along the entire length of the cell to the upper and lower sheets to divide the cell into a plurality of compartments. The front edges of the upper and lower sheets and the front of the pair of ribs forms a mouth serving as a leading edge air inlet. The upper sheet, lower sheet, first and second ribs, leading edge air inlet, and trailing edge form the outer boundaries of the cell.

The lower sheet includes a first forward skin and a second rearward skin. The first forward skin has a front edge forming the front edge of the lower sheet and extending to a rear edge at a rear portion, and the second rearward skin has a front edge at a front portion disposed forward of said rear edge of the first forward skin and extending to a rear edge forming the rear edge of the lower sheet. Preferably, the rear portion of the first forward skin overlaps the front portion of the second rearward skin. Also, the rear portion of the first forward skin and the front portion of the second rearward skin form a closable air inlet vent opening into the cell. A first side of the rear portion of the first forward skin is connected at a first connection to the first rib at a point spaced above the junction of the second rearward skin and the first rib. A second side of the rear portion of the first forward skin is connected at a second connection to the second rib at a point spaced above the junction of the second rearward skin and the second rib. A substantially central point of the rear portion of the first forward skin is connected to a junction of the central rib and a central portion of the front portion of the second rearward skin. Thus, when air pressure inside the cell exceeds the air pressure outside the cell, the rear portion of the first forward skin is forced onto the front portion of the second rearward skin to close the air inlet vent by lying substantially flat on the front portion of the second rearward skin without billowing out of the cell to maintain air pressure inside of said cell. When the air pressure outside the cell exceeds the air pressure inside the cell, the rear portion of the first forward skin is forced upwardly away from the front portion of the second rearward skin to open the air inlet vent. In opening, the air inlet vent forms a shape across the cell that curves upwardly from the first and second connections to form a convex upper surface adjacent both the first and second connections. Each convex upper surface trails downwardly in a substantially straight line to the central junction, and each convex upper surface is closer to its respective first and second connections than to the central junction.

In one preferred embodiment, the first side of the rear portion of the first forward skin is connected at a third connection to the first side sheet at the junction of the front portion of the second rearward skin and the first side sheet, and a second side of the rear portion of the first forward skin is connected at a fourth connection to the second side sheet at the junction of the front portion of the second rearward skin and the second side sheet. A load supported by the load bearing ribs is connectable to the ribs at at least one of the respective third and fourth connections. In an alternate embodiment, the front edges of the first and second side sheets are formed with first and second notches, respectively, adjacent the side edges of the lower sheet, along at least a portion of the side edges of the lower sheet. The notches extend rearwardly from the side sheet front edges to a point adjacent the rear edge of the first forward skin. The first connection is disposed adjacent the top of the first notch and the second connection is disposed adjacent the top of the second notch.

Various additional advantages and features of novelty which characterize the invention are further pointed out in the claims that follow. However, for a better understanding of the invention and its advantages, reference should be made to the accompanying drawings and descriptive matter which illustrate and describe preferred embodiments of the invention.

DETAILED DESCRIPTION OF THE PREFERRED EMBODIMENT

Referring to FIGS. 2-8, parachute cell 32 according to the present invention is shown in various embodiments and as part of a ram air type parachute 30. Throughout these descriptions, elements of the parachute cell 32 may be described as being above or below a certain point. Although when inflated some surfaces may curve, and the parachute may assume various angles of attack, references to "above" and "below" and similar language are used assuming that the lower sheet or skin is substantially flat and horizontal. The ram air type parachute has each of its cells open at its front end to provide for inflation during flight. The open ends are the leading edge of an airfoil and the "ramming" or compressing of the air provides the inflation to form and retain the airfoil shape of the parachute canopy. The large surface area to low mass weight of the canopy sets up a "drag" which reduces the rate of descent of the payload which has a relatively small surface and high mass weight. In addition to this drag, there is a lifting force derived by the passage of air over and under the airfoil shaped canopy which provides the flight characteristics.

Parachutes of this general type are maneuverable as long as an air speed can be maintained. There is little difficulty in achieving a steady rate of descent of about 14 feet per second at an air speed of 25 m.p.h. However, for complete control it is often desirable to descend with less forward motion and the parachutist has flight control means which permit him to stall or near stall the airfoil to cause loss of forward motion. Such a maneuver is very useful from a control point of view because it can permit nearly vertical or increased rate of descent, but it can be dangerous because in such a condition the canopy tends to fall uncontrollably to the right, to the left, or back leaving the parachutist in an uncontrollable, increasing rate of descent.

Generally at least three support lines extend from each side of the parachute to support a load. One or more control lines extend from each side of the parachute at the back of the parachute to control speed and direction.

Figure 1:
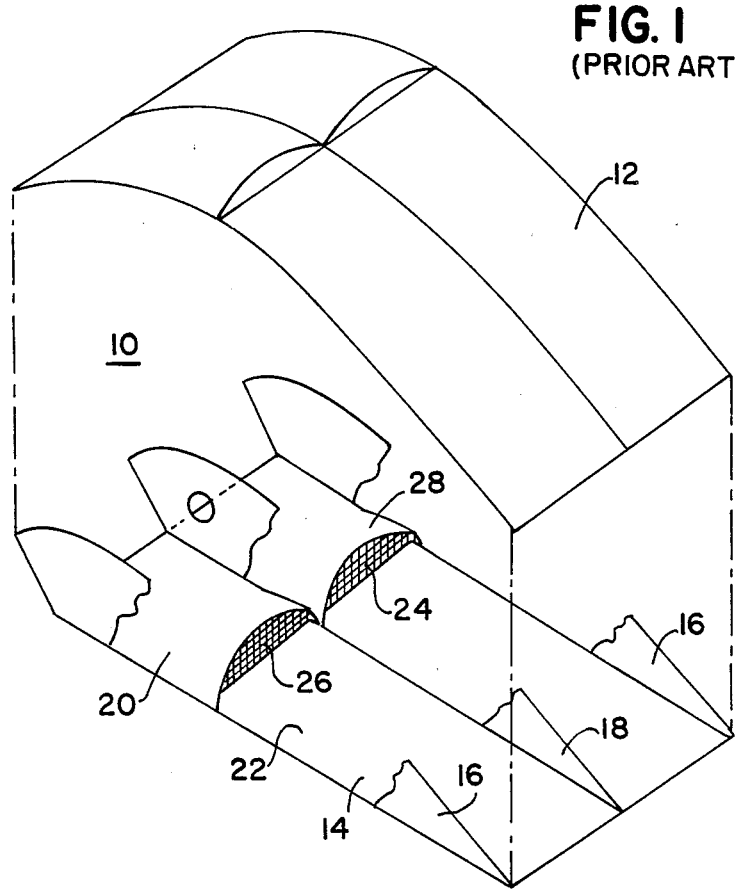
FIG. 1 is a perspective exploded view of a prior art ram air type parachute cell.
Figure 2:
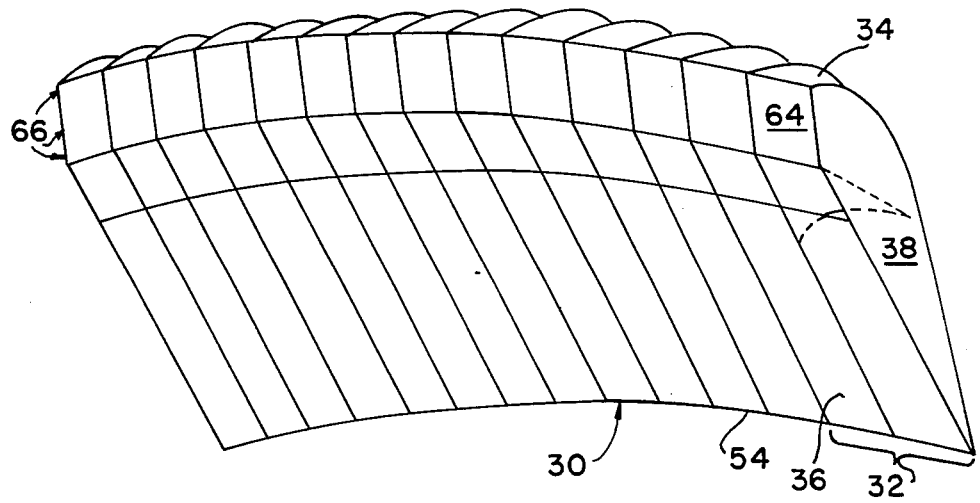
FIG. 2 is a perspective view of a ram air type parachute incorporating parachute cells according to the present invention.
Figure 3B:
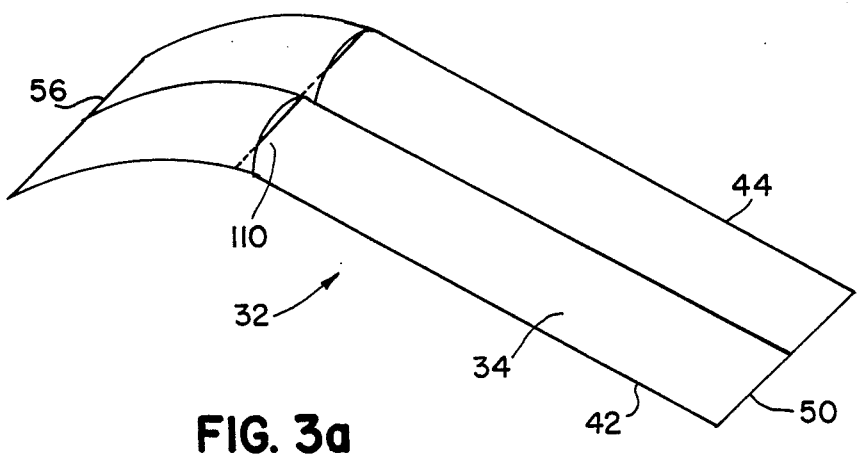
FIG. 3b is a perspective view of the upper portion of the parachute cell.
Figure 3A:
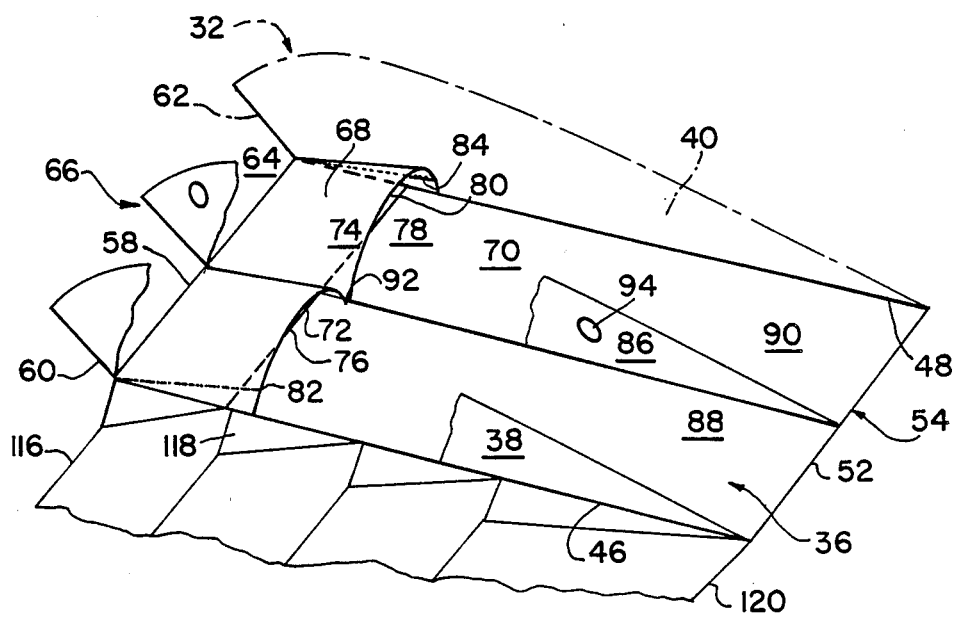
FIG. 3 is a perspective view of the lower portion of a parachute cell in accordance with the present invention.

FIG. 2 shows a ram air type parachute 30 incorporating parachute cells 32 according to the present invention. Only the canopy portion is shown for clarity. FIGS. 3a and 3b are perspective views showing one embodiment of a parachute cell 32 according to the present invention. In both FIGS. 2 and 3, the parachute cells 32 are shown in their inflated condition. To permit inflation and deflation of parachute 30, all of the components are flexible and lightweight as is well known. Parachute cell 32 includes upper sheet or skin 34, lower sheet or skin 36 and two side sheets or ribs 38, 40 which together form the boundaries of cell 32. Upper sheet 34 is connected to lower sheet 36 along their entire cords (front-to-back length) by ribs 38, 40 which need not be substantially perpendicular as long as they increase rigidity of the cell. Ribs 38, 40 are fastened such as by stitching to the upper side edges 42, 44, and lower side edges 46, 48 of upper and lower sheets 34, 36. The rear edge 50 of upper sheet 34 and the rear edge 52 of lower sheet 36 are fastened to each other as by stitching to form trailing edge 54 of cell 32. The front edge 56 of upper sheet 34 and the front edge 58 of lower sheet 36 are spaced apart from each other to form, along with the front edges 60, 62 of side ribs 38, 40, mouth 64 which serves as a leading edge air inlet at the leading edge 66 of cell 32. Mouth 64 serves as the primary entry point for air to inflate the parachute cell. Because the trailing edge is substantially closed, the air is "rammed" and compressed in the cell to inflate the cell and provide the cell with its airfoil shape. While some air enters cell 32, other air travels around, above, and below parachute 30 and the air foil shape of parachute 30 creates lift as the parachute glides forward through the air.

Lower sheet 36 of cell 32, as shown in FIG. 3, is formed of two separate skins, forward skin 68 and rearward skin 70. The front edge of forward skin 68 is front edge 58 which forms part of the leading edge 66 of cell 32, while the rear edge of rearward skin 70 is rear edge 52 and forms the trailing edge 54 of cell 32. Forward skin 68 extends rearwardly to rear edge 72 at rear portion 74 and rearward skin 70 extends forwardly to front edge 76 at front portion 78. Rear edge 72 of forward skin 68 extends along the cord length of cell 32 to a point behind front edge 76 of rearward skin 70. Thus, forward skin 68 and rearward skin 70 overlap. Preferably, as shown in the figures, rear edge 72 of forward skin 68 is disposed above and overlaps front edge 76 of rearward skin 70. Incoming air is thus channeled rearwardly into cells, the tendency of the parachute to recover from lack of air volume and pressure is quicker, and the direction of the incoming air tends to move the parachute in a forward direction. This permits and facilitates forward travel of parachute 30 when recovering from deep braking maneuvers in which the rear of the parachute is pulled downwardly by control lines to create drag and slow down the parachute. During deep braking and/or a stall, air within the parachute tends to be squeezed out. It has been found that approximately five inches of overlap is desired to provide proper performance. However, the amount of overlap may be varied depending on the span (side-to-side distance) of the cell. Wider cells require more overlap to compensate for billowing forward of rear portion 74 of forward skin 68 during flight.

Rear portion 74 of forward skin 68 and front portion 78 of rearward skin 70 combine to form a closable air inlet vent 80. Air inlet 80 opens and closes in response to air pressure differences. Thus, when the air pressure inside of cell 32 is greater than the air pressure outside of cell 32, air inlet 80 is closed and when the air pressure outside of cell 32 is greater, air inlet 80 is open. More precisely, air inlet 80 is closed by the movement of air out of cell 32 through the air inlet which carries rear portion 74 of forward skin 68 with it. The operation is automatic and simple. When the pressure inside is greater, rear portion 74 of forward skin 68 is forced outward and onto front portion 78 of rearward skin 70 to maintain the air pressure inside cell 32. In this configuration, forward skin 68 lies relatively flat. When the pressure outside is greater, rear portion 74 of forward skin 68 is forced upwardly away from front portion 78 of rearward skin 70 to open air inlet 80 and increase or maintain the pressure inside cell 32. When air inlet 80 is open, rear edge 72 of forward skin 68 forms a shape that curves upwardly between side edges 46 and 48.

Figure 4A:
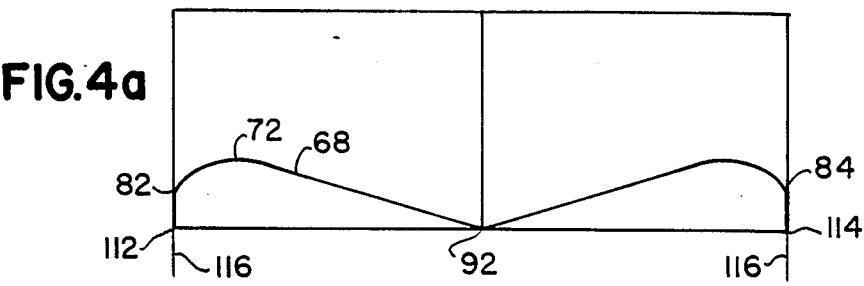
FIG. 4a is a rear view of the forward skin of the lower sheet when the lower air inlet is open and with secondary connection points.
Figure 4B:
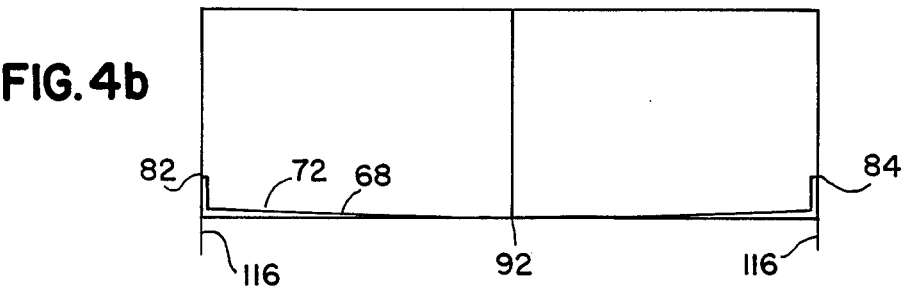
FIG. 4b is a rear view of the forward skin of the lower sheet when the lower air inlet is closed.
Figure 5:
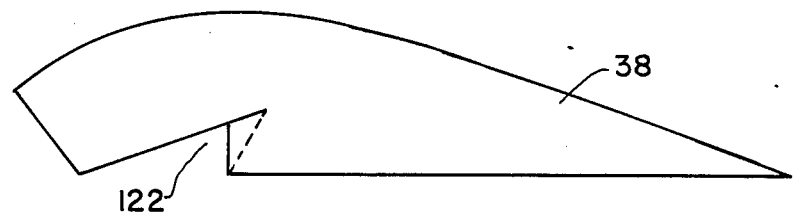
FIG. 5 is a side view of a second embodiment of a rib of the parachute cell.

As shown in FIGS. 3 and 4, as an improvement over and in contradistinction with my earlier embodiment of cell 10, side edges 46, 48 of forward skin 68 are not connected directly to the base of side ribs 38, 40 where the side ribs reach the level of and meet rearward skin 70. Rather, side edge 46 is connected to side rib 38 at rear edge 72 at a point above the level of front portion 78 of rearward skin 70, at connection point 82. Likewise, side edge 48 is connected to side rib 40 at rear edge 72 at a point above the level of front portion 78 of rearward skin 70, at connection point 84. Preferably, the sides of forward skin 68 are connected, as by stitching, along their entire cordal length to side ribs 38, 40 to anchor the forward skin and preserve aerodynamic performance. Additionally, the width of rear portion 74 forward skin 68 (the dimension shown in FIG. 4) is selected so that when air inlet 80 is open, sufficient air may enter cell 32 and when air inlet 80 is closed, forward skin 68 lies relatively flat as part of lower sheet 36. This width distance is equal to the width (span) of cell 32 plus twice the distance from lower sheet 36 to either of connection points 82, 84, as best shown in FIG. 4b. Thus, when air vent 80 is closed, forward skin 68 does not bunch up and does not billow out. Nor does it fall out of cell 32 below lower sheet 36 to create drag on the parachute. This is accomplished without any additional restraining means such as mesh panel 24. The smooth lower surface of lower sheet 36 when air inlet 80 is closed maximizes the efficiency and optimizes the aerodynamics of cell 32 by minimizing resistance. Because no restraining means is used, the total weight and bulk of cell 32 is thereby reduced to further improve performance. Additionally, manufacturing operations are simplified and manufacturing costs are reduced. The height or distance above lower sheet 36 of connection points 82, 84 may be varied depending on the purpose for which parachute 30 is to be used. As the height increases, the width of forward skin 68 must likewise increase to maintain optimum operating characteristics such as a smoothly flat rear portion 74 when air inlet 80 is closed. A higher connection point causes air inlet 80 to be larger when it is open. This provides a quicker acceleration and is useful for low drops such as used with heavy military equipment. A lower connection point forms a smaller air inlet 80 and provides a slower and smoother acceleration, as is desirable for human parachutists. As a further improvement, notches may be formed in the side ribs as shown in FIG. 5 and as will be discussed below.

Thus far, cell 32 has been described as having a single compartment. However, it is preferable to divide cell 32 into a plurality of compartments as shown in the Figures. This is accomplished using central ribs. Referring back to FIG. 3, central rib 86 divides cell 32 into two compartments 88, 90, each compartment serving in many ways like a separate cell during operation. In this embodiment, central rib 86 is disposed midway between side ribs 38 and 40 to form two equal and separate compartments. Central rib 86 is connected to upper sheet 12 and lower sheet 14 in a similar manner as side ribs 38, 40. The midpoint of rear edge 72 of forward skin 68 may be attached to central rib 86 at a point above the level of lower sheet 36. However, as shown, it is preferable to locate central connection point 92 at the junction of central rib 86 and rearward skin 70. Thus, when air inlet 80 is open, rear edge 72 of forward skin 68 forms a shape, as shown in FIG. 4a, that curves upwardly from connection points 82, 84 to form a convex upper surface adjacent both connection points 82, 84 such that each convex surface trails downwardly in a substantially straight line to central connection point 92. Each convex upper surface is closer to its respective connection point 82, 84 than to central connection point 92. Additionally, central rib 86 may be formed with one or more crossports 94 to provide fluid communication between compartments 88 and 90 to equalize the air pressure therebetween. Side ribs 38, 40 also may be provided with crossports 94 to permit air to pass between cells. In a parachute 30 having a plurality of cells, crossports 94 may be used to provide communication between any or all cells.

The addition of air vent 80 in cell 32, as discussed above, provides superior control during stall recovery, vertical descent, and initial inflation. Additionally, the presence of air inlet 80 allows the surface area of mouth 64 of cell 32 to be designed smaller while maintaining the same inflation, operating, and flight characteristics for the cell. The smaller mouth 64 provides smoother air flow and less drag.

Figure 7:
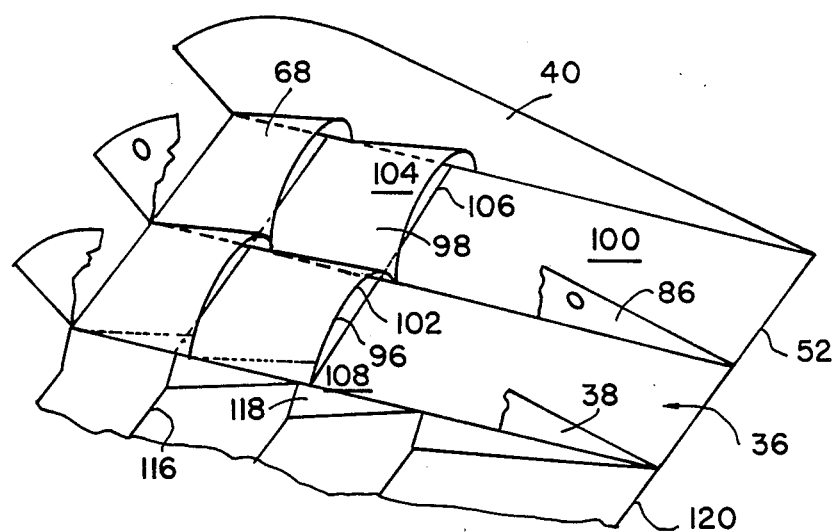
FIG. 7 is a perspective view of another embodiment of the parachute.
Figure 6:
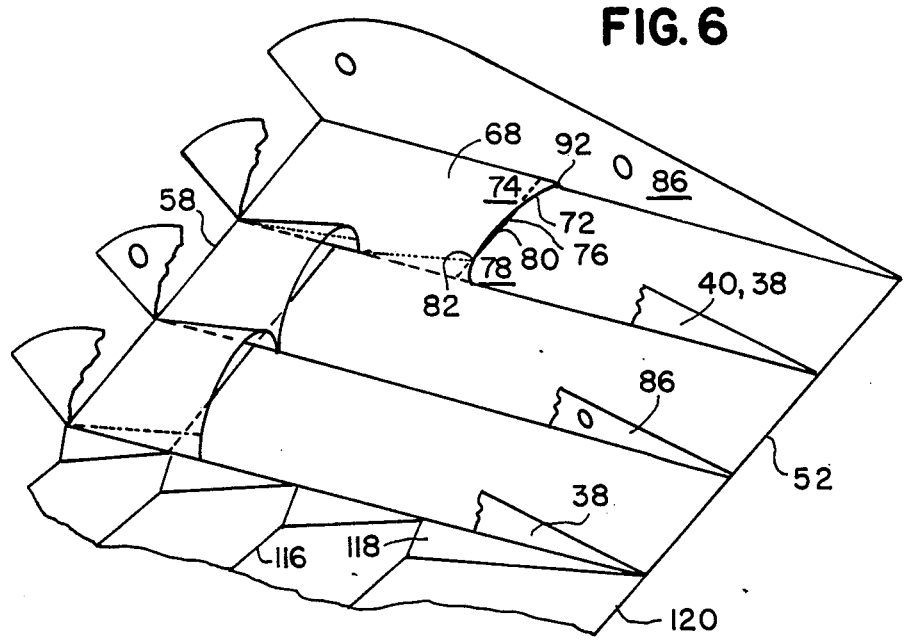
FIG. 6 is a perspective view of a third embodiment of the parachute cell.

The location of rear edge 72 of forward skin 68 along the cord of cell 32 is preferably selected to be approximately at the point where ribs 38, 40, 86 have their highest points. This location is the point of fastest air speed around cell 32 and, therefore, is the point where the pressure difference between the air above cell 32 and below cell 32 is greatest. It is at this location that the rib provides the least tendency to buckle from outward force on forward skin 68 which pulls against the hinge in a downward motion. However, air inlet 80 and rear edge 72 may be located at other locations along the cord of cell 32. In fact, when a plurality of cells 32 are connected to form parachute 30, sharing adjacent side ribs, the cordal location of air inlet 80 for any or all cells 32 may differ to alter the flight characteristics of the parachute, as shown in FIG. 6. FIG. 6 also shows half of an adjacent cell 32 sharing one of its side ribs with the fully shown cell 32. Additionally, all of the cells of a parachute need not have air inlets 80, or alternately, as shown in FIG. 7, a single cell 32 can have a plurality of inlets along the cordal distance of the cell. As shown in FIG. 7, a second air inlet 96 is formed through rearward skin 70 by forming rearward skin 70 of intermediate skin 98 and rearward skin 100. Intermediate skin 98 has a rear edge 102 at a rear portion 104 and rearward skin 100 has a front edge 106 at a front portion 108, so that rear portion 104 and front portion 108 overlap each other. Preferably rear portion 104 overlaps front portion 108 to form second air inlet 96. The sides of rear portion 104 are connected to side ribs 38, 40 and central rib 86 in an identical manner to the connection of rear portion 74.

Figure 8:
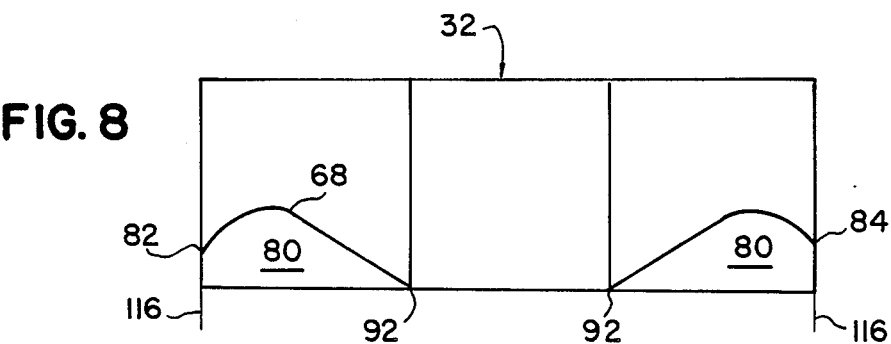
FIG. 8 is a rear view of another embodiment of the parachute cell.

Referring to FIG. 8, a rear view similar to FIG. 4 is shown. In this embodiment two central ribs 86 divide cell 32 into three compartments. However, while air vents 80 are formed in the end compartments, air vents need not be formed in every compartment and, as shown, are not formed in the middle compartment.

Also, as shown in FIG. 3, upper sheet 34 may be formed with a centrally located air outlet vent 110 to relieve additional air pressure during inflation of the entire parachute. This central section is segregated by way of non-crossported ribs to either side. Thus, little or no pressure escapes from the portions of the parachute.

As shown in FIG. 4a, although rear edge 72 of forward skin 68 is initially connected to side ribs 38, 40 at connection points 82, 84, the sides of rear portion 74 may extend further to secondary connection points 112, 114 which are located at the junction of rearward skin 70 with side rib 38 and side rib 40, respectively. This further strengthens the connection of forward skin 68 to side ribs 38, 40. The strength of these connections is important because typically in a parachute comprising a plurality of cells bounded by side ribs, every alternate side rib or every side rib is a load bearing side rib and supports a load (equipment, a person) through support lines 116 shown in FIG. 3 connected to the load bearing ribs. (In some parachutes, support lines are connected to less than half the ribs.) Frequently, support lines 116 are connected to load supporting ribs through load distributing flaps known as flairs 118, rather than directly to the ribs. Flairs prevent lower sheet 36 from buckling and help to maintain rib configuration thus affecting the configuration of forward skin 68 and maintaining rear portion 74 of forward skin 68 flat when air vent 80 is closed. Thus, the connection points must be strong to support the parachute's load. The support lines are connected to connection points to optimally distribute the load to spaced locations throughout the entire parachute. Also, control lines 120 are connected at or near the trailing edge of the parachute to either side of the parachute to steer and brake the parachute by pulling the trailing edge downwardly to create drag in response to the control line being pulled. When trailing edge 54 is pulled downwardly a distance sufficient to stall parachute 30, air inlet 80 assists mouth 64 in reinflating cells 32.

In the alternate embodiment of FIG. 5, the weight and bulk of cell 32 are further reduced to further increase the operating and flight characteristics of the cell. In this embodiment, rather than extend the sides of rear portion 74 to secondary connection points, side ribs 38, 40 are notched at 122 as by removing a portion of their material which resides below forward skin 68. In FIG. 5, two possible shapes for notch 122 are shown, one in solid line and one in dotted line. Any other configurations are possible although it is preferred that the notch extend rearwardly from front edge 60, 62 at least as far as front edge 76 of rearward skin 70. As the entire cordal length of forward skin 68 may be stitched to side ribs 38, 40 to minimize bubbling, the material in ribs 38, 40, below forward skin 68 can be removed. This still enables rear portion 74 to be flat when air inlet is closed. In this embodiment, the front support lines 116 or flairs 118 are connected along the stitched length of forward skin 68. Thus, connection points 82, 84 serve as the load bearing connection for the front support lines 116. (The rear support lines are connected, as before, to the junction of side ribs 38, 40 and rearward skin 70.) As seen in FIG. 5 and also FIG. 4, this configuration serves to evenly distribute the load while further reducing the weight and bulk of cell 32.

Numerous characteristics, advantages, and embodiments of the invention have been described in detail in the foregoing description with reference to the accompanying drawings. However, the disclosure is illustrative only and the invention is not limited to the precise illustrated embodiments. Various changes and modifications may be effected therein by one skilled in the art without departing from the scope or spirit of the invention.

I claim:

1. A flow form device cell of the type used primarily to maintain both vertical and horizontal stability and maneuverability in a predetermined fluid environment, said cell having a leading edge, a trailing edge and two sides, said cell comprising:

a flexible sheet having a front edge, a rear edge, and first and second side edges, said front edge forming a portion of said leading edge of said cell and said rear edge forming a portion of said trailing edge of said cell;

a flexible lower sheet spaced below said upper sheet and having a front edge, a rear edge, and first and second side edges, said front edge forming a portion of said leading edge of said cell and said rear edge forming a portion of said trailing edge of said cell, said rear edge of said lower sheet and said rear edge of said upper sheet being fastened together to form said trailing edge;

a pair of flexible side sheets connecting said upper sheet to said lower sheet, a first side sheet being disposed between said first side edge of said upper sheet and said first side edge of said lower sheet along the entire length of said upper and lower sheets and a second side sheet being disposed between said second side edge of said upper sheet and said second side edge of said lower sheet along the entire length of said upper and lower sheets;

a leading edge air inlet formed by said front edges of said upper and lower sheets and the front edges of said pair of side sheets;

wherein said upper sheet, said lower sheet, said pair of side sheets, said leading edge air inlet, and said trailing edge form the outer boundaries of said cell and said cell comprises at least one closable air inlet vent opening into said cell; and wherein said lower sheet comprises a first forward skin and a second rearward skin, said first forward skin having a front edge forming the front edge of said lower sheet and extending to a rear edge at a rear portion, said second rearward skin having a front edge at a front portion and extending to a rear edge forming the rear edge of said lower sheet, said front edge of said second rearward skin being disposed forward of said rear edge of said first forward skin so that one of said rear portion of said first forward skin and said front portion of said second rearward skin overlaps the other, said rear portion of said first forward skin and said front portion of said second rearward skin form a first closable air inlet vent opening into said cell wherein a first side of one of said rear portion of said first forward skin and said front portion of said second rearward skin is connected at a first connection to said first side sheet at a point spaced above the junction of the other of said second rearward skin and said first forward skin with said first side sheet, and a second side of one of said rear portion of said first forward skin and said front portion of said second rearward skin is connected at a second connection to said second side sheet at a point spaced above the junction of the other of said second rearward skin and said first forward skin with said second side sheet, one of said rear portion of said first forward skin and said front portion of said second rearward skin having a predetermined width such that when air pressure inside said cell exceeds the air pressure outside said cell one of said rear portion of said first forward skin and said front portion of said second rearward skin is forced onto the other of said front portion of said second rearward skin and said rear portion of said first forward skin to close said first air inlet vent opening by lying substantially flat on the other of said front portion of said second rearward skin and said rear portion of said first forward skin without billowing out of said cell and to maintain air pressure inside said cell, and when the air pressure outside said cell exceeds the air pressure inside said cell one of said rear portion of said first forward skin and said front portion of said second rearward skin is forced upwardly away from the other of said front portion of said second rearward skin and said rear portion of said first forward skin to open said first air inlet vent opening by forming a shape that curves upwardly from said first and second connections to at least one high point therebetween.

2. A flow form device cell according to claim 1 wherein said rear portion of said first forward skin and said front portion of said second rearward skin overlap by 5 inches.

3. A flow form device cell according to claim 1 further comprising an air outlet vent formed in said upper sheet.

4. A flow form device cell according to claim 1 wherein the predetermined fluid environment is the atmosphere.

5. A flow form device cell according to claim 4 wherein said cell is a parachute cell.

6. A flow form device cell according to claim 5 wherein at least one said parachute cell is combined with other parachute cells to form a ram air type parachute.

7. A flow form device cell according to claim 5 wherein a plurality of said parachute cells are combined to form a ram air type parachute.

8. A flow form device cell according to claim 5 wherein a plurality of parachute cells are combined to form a parachute wherein adjacent cells share adjacent side sheets.

9. A flow form device cell according to claim 5 wherein said rear portion of said first forward skin is connected to said first and second side sheets at said rear edge.

10. A flow form device cell according to claim 5 wherein said air inlet vent opening assists the operation of said leading edge air inlet so that for a cell of predetermined dimensions said leading edge air inlet has a reduced area while said cell maintains desirable inflation, operating, and flight characteristics.

11. A flow form device cell according to claim 5 wherein said rear edge of said first forward skin is located in a lengthwise direction at a location corresponding to a location where the lowest outside air pressure against said upper sheet occurs during full forward flight.

12. A flow form device cell according to claim 5 wherein said rear portion of said first forward skin overlaps said front portion of said second rearward skin, and wherein a first side of said rear portion of said first forward skin is connected at a first connection to said first side sheet at a point spaced above the junction of said front portion of said second rearward skin and said first side sheet, and a second side of said rear portion of said first forward skin is connected at a second connection to said second side sheet at a point spaced above the junction of said front portion of said second rearward skin and said second side sheet, said rear portion of said first forward skin having a predetermined width such that when air pressure inside said cell exceeds the air pressure outside said cell said rear portion of said first forward skin is forced onto said front portion of said second rearward skin to close said first air inlet vent opening by lying substantially flat on said front portion of said second rearward skin without billowing out of said cell and to maintain air pressure inside said cell, and when the air pressure outside said cell exceeds the air pressure inside said cell said rear portion of said first forward skin is forced upwardly away from said front portion of said second rearward skin to open said first air inlet vent opening.

13. A flow form device cell according to claim 12 wherein said first and second side sheets comprise ribs and wherein said cell further comprises at least one central rib disposed between said first and second ribs, extending from said leading edge of said cell to said trailing edge of said cell, and connected along the entire length of said cell to said upper and lower sheets to divide said cell into a plurality of compartments.

14. A flow form device cell according to claim 13 wherein at least one of said central ribs comprises a crossport opening to permit air to flow between respective adjacent compartments.

15. A flow form device cell according to claim 13 wherein said cell comprises one central rib disposed substantially centrally between said first and second ribs.

16. A flow form device cell according to claim 15 wherein a substantially central point of said rear portion of said first forward skin is connected to a central junction of said central rib and said front portion of said second rearward skin such that when said air inlet vent opening is open, said rear portion of said first forward skin forms a shape across said cell that curves upwardly from said first and second connections to form a convex upper surface adjacent both said first and second connections, each said convex upper surface trailing downwardly in a substantially straight line to said central junction, and each said convex upper surface being closer to its respective first and second connections than to said central junction.

17. A flow form device cell according to claim 12 wherein said side sheets comprise ribs and at least one of said ribs is load supporting.

18. A flow form device cell according to claim 17 further comprising a plurality of flairs disposed along the length of said cell and attached to the lower edge of said load supporting ribs, each said flair being connectable to a support line.

19. A flow form device cell according to claim 17 further comprising a plurality of support lines disposed along the length of said cell and attached directly to said cell at the lower edge of said load supporting ribs.

20. A flow form device cell according to claim 12 wherein said cell comprises a plurality of closable air inlet openings into said cell.

21. A flow form device cell according to claim 20 wherein said cell comprises a second closable air inlet vent opening into said cell, said second air inlet vent opening being formed through said second rearward skin, said second rearward skin comprising a third intermediate skin and a fourth rearward skin, said third intermediate skin having a rear edge at a rear portion, said fourth rearward skin having a front edge at a front portion so that said rear portion of said third intermediate skin overlaps said front portion of said fourth rearward skin to form said second closable air inlet vent opening, wherein a first side of said rear portion of said third intermediate skin is connected at a first connection to said first side sheet at a point spaced above the junction of said fourth rearward skin and said first side sheet, and a second side of said rear portion of said third intermediate skin is connected at a second connection to said second side sheet at a point spaced above the junction of said fourth rearward skin and said second side sheet such that when air pressure inside said cell exceeds the air pressure outside said cell said rear portion of said third intermediate skin is forced onto said front portion of said fourth rearward skin to close said second air inlet vent opening by lying substantially flat on said front portion of said fourth rearward skin and to maintain air pressure inside said cell, and when the air pressure outside said cell exceeds the air pressure inside said cell said rear portion of said third intermediate skin is forced upwardly away from said front portion of said fourth rearward skin to open said second air inlet vent opening by forming shape that curves upwardly from said first and second connections to at least one high point therebetween to form at least one convex upper surface.

22. A flow form device cell according to claim 12 wherein said first side of said rear portion of said first forward skin is connected at a third connection to said first side sheet at the junction of said front portion of said second rearward skin and said first side sheet and a second side of said rear portion of said first forward skin is connected at a fourth connection to said second side sheet at the junction of said front portion of said second rearward skin and said second side sheet.

23. A flow form device cell according to claim 22 wherein said side sheets comprise ribs and at least one of said ribs is load bearing, a load supported by said ribs being connectable to said ribs at at least one of said respective third and fourth connections.

24. A flow form device cell according to claim 12 wherein said first and second side sheets have front edges and are formed with first and second notches, respectively, which extend rearwardly from said side sheet front edges at least to a point adjacent said front edge of said second rearward skin, wherein said first connection is disposed adjacent the top of said first notch and said second connection is disposed adjacent the top of said second notch.

25. A parachute cell for a ram air type parachute, said cell having a leading edge a trailing edge and two sides, said cell comprising:
a flexible upper sheet having a front edge, a rear edge, and first and second side edges, said front edge forming a portion of said leading edge of said cell and said rear edge forming a portion of said trailing edge of said cell;

a flexible lower sheet spaced below said upper sheet and having a front edge, a rear edge, and first and second side edges, said front edge forming a portion of said leading edges of said cell and said rear edge forming a portion of said trailing edge of said cell, said rear edge of said lower sheet and said rear edge of said upper sheet being fastened together to form said trailing edge;

a pair of flexible side sheets comprising ribs connecting said upper sheet to said lower sheet, a first rib being disposed between said first side edge of said upper sheet and said first side edge of said lower sheet along the entire length of said upper and lower sheets and a second rib being disposed between said second side edge of said upper sheet and said second side edge of said lower sheet along the entire length of said upper and lower sheets, at least one of said ribs being load supporting;

a central rib disposed substantially centrally between said first and second ribs, extending from said leading edge of said cell to said trailing edge of said cell, and connected along the entire length of said cell to said upper and lower sheets to divide said cell into a plurality of compartments;

a leading edge air inlet formed by said front edges of said upper and lower sheets and the front edges of said pair of ribs;

wherein said upper sheet, said lower sheet, said pair of ribs, said leading edge air inlet, and said trailing edge form the outer boundaries of said cell, and said cell comprises at least one closable air inlet vent opening into said cell; and wherein said lower sheet comprises a first forward skin and a second rearward skin, said first forward skin having a front edge forming the front edge of said lower sheet and extending to a rear edge at a rear portion, said second rearward skin having a front edge at a front portion and extending to a rear edge forming the rear edge of said lower sheet, said front edge of said second rearward skin being disposed forward of said rear edge of said first forward skin so that said rear portion of said first forward skin overlaps said front portion of said second rearward skin, said rear portion of said first forward skin and said front portion of said second rearward skin form a closable air inlet vent opening into said cell wherein a first side of said rear portion of said first forward skin is connected at a first connection to said first rib at a point spaced above the junction of said front portion of said second rearward skin and said first rib, and a second side of said rear portion of said first forward skin is connected at a second connection to said second rib at a point spaced above the junction of said front portion of said second rearward skin and said second rib and a substantially central point of said rear portion of said first forward skin is connected to a central junction of said central rib and said front portion of said second rearward skin, said rear portion of said first forward skin having a predetermined width such that when air pressure inside said cell exceeds the air pressure outside said cell said rear portion of said first forward skin is forced onto said front portion of said second rearward skin to close said air inlet vent opening by lying substantially flat on said front portion of said second rearward skin without billowing out of said cell to maintain air pressure inside said cell, and when the air pressure outside said cell exceeds the air pressure inside said cell said rear portion of said first forward skin is forced upwardly away from said front portion of said second rearward skin to open said air inlet vent opening by forming a shape across said cell that curves upwardly from said first and second connections to form a convex upper surface adjacent both said first and second connections, each said convex upper surface trailing downwardly in a substantially straight line to said central junction, and each said convex upper surface being closer to its respective first and second connections than to said central junction.

26. A parachute cell according to claim 25 wherein said first side of said rear portion of said first forward skin is connected at a third connection to said first side sheet at the junction of said front portion of said second rearward skin and said first side sheet, and a second side of said rear portion of said first skin is connected at a fourth connection to said second side sheet at the junction of said front portion of said second rearward skin and said second side sheet, and a load supported by said load bearing ribs is connectable to said ribs at at least one of said respective third and fourth connections.

27. A parachute cell according to claim 25 wherein said first and second side sheets have front edges and are formed with first and second notches, respectively, which extend rearwardly from said side sheet front edges at least to a point adjacent said front edge of said second rearward skin, and wherein said first connection is disposed adjacent the top of said first notch and said second connection is disposed adjacent the top of said second notch.

* * * * *

UNITED STATES PATENT AND TRADEMARK OFFICE
CERTIFICATE OF CORRECTION

PATENT NO. : 4,930,728

DATED : June 5, 1990

INVENTOR(S) : Whittington

It is certified that error appears in the above-identified patent and that said Letters Patent is hereby corrected as shown below:

Title page, item [19], Inventor's name "Wittington" should read
--Whittington--.

item [76], "George R. Wittington" should read
--George R. Whittington--.

Signed and Sealed this

Twentieth Day of August, 1991

Attest:

HARRY F. MANBECK, JR.

*Attesting Officer*  *Commissioner of Patents and Trademarks*